United States Patent
Tsuda et al.

(10) Patent No.: US 8,262,267 B2
(45) Date of Patent: Sep. 11, 2012

(54) LAMP DEVICE-INTEGRATED REARVIEW MIRROR

(75) Inventors: Tsuyoshi Tsuda, Saitama (JP); Jun Morimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 519 days.

(21) Appl. No.: 12/453,516

(22) Filed: May 13, 2009

(65) Prior Publication Data

US 2010/0033983 A1 Feb. 11, 2010

(30) Foreign Application Priority Data

Aug. 7, 2008 (JP) ................................. 2008-204287

(51) Int. Cl.
*B60Q 1/26* (2006.01)
*B60R 1/12* (2006.01)
(52) U.S. Cl. ....................................... 362/494; 362/473
(58) Field of Classification Search .................. 362/473, 362/474, 544, 545, 494; 340/468, 472, 475, 340/478
See application file for complete search history.

(56) References Cited

U.S. PATENT DOCUMENTS

| 5,851,064 A * | 12/1998 | Lyons ........................... 362/494 |
| 2003/0169160 A1* | 9/2003 | Rodriguez Barros et al. ........................ 340/426.1 |
| 2007/0109804 A1 | 5/2007 | Pastrick et al. |

FOREIGN PATENT DOCUMENTS

| GB | 2 129 749 A | 5/1984 |
| JP | 2004-189019 | 7/2004 |

* cited by examiner

*Primary Examiner* — Thomas Sember
(74) *Attorney, Agent, or Firm* — Squire Sanders (US) LLP

(57) ABSTRACT

A lamp device-integrated rearview mirror 30 includes a mirror member 34 oriented toward the rear side of a vehicle body and a single bulb 40 provided in a housing 31 attached to the vehicle body. The lamp device-integrated rearview mirror may also include a reflecting member 35 configured to reflect the light emitted from the bulb 40 toward the rear side of the vehicle body and a reflector 36 configured to reflect the light toward the front side of the vehicle body. The reflecting member 35 may be provided on the rear side of a lens 32 attached to the housing 31 to transmit the irradiation light, and the reflector 36 may be provided inside the housing 31. The mirror member 34 may be fitted in the opening portion of the housing 31.

22 Claims, 6 Drawing Sheets

LAMP DEVICE-INTEGRATED REARVIEW MIRROR

BACKGROUND

1. Field

Embodiments of the present invention relate generally to lamp device-integrated rearview mirrors and, more particularly, to a lamp device-integrated rearview mirror configured to direct, in the back and forth directions of a vehicle body, light emitted from a light source accommodated in a housing.

2. Description of the Related Art

Japanese Patent Laid-Open No. 2004-189019 (Japan '019) discloses a rearview mirror device in which a transmissive lens is provided on the vehicle body front side of a housing and a blinker lamp bulb and a position lamp bulb are housed inside the lens.

However, the technology described in Japan '019 is to orient the illuminating direction of the blinker and of the position lamp toward the front of the vehicle body but does not consider enhancement of visibility from the rear side of the vehicle body.

In addition, the rearview mirror device disclosed in Japan '019 uses the three bulbs in total for the blinker and position lamp, which poses a problem in that the housing for the rearview mirror is likely to increase in size.

SUMMARY

According to an embodiment of the invention, a lamp device-integrated rearview mirror is provided. The lamp device-integrated rearview mirror may comprise a mirror member oriented toward a rear side of a vehicle body of a vehicle. The lamp device-integrated rearview mirror may further include a light source. The mirror member and light source may be included in a housing attached to the vehicle body. The lamp device-integrated rearview mirror may also comprise a pair of reflecting members configured to reflect light emitted from the light source, toward the front side and rear side of the vehicle body.

According to another embodiment of the invention, a method is provided. The method comprises providing a mirror member toward a rear side of a vehicle body of a vehicle, and including a light source and the mirror member in a housing attached to the vehicle body. The method may further include configuring a pair of reflecting members to reflect light emitted from the light source, toward the front side and rear side of the vehicle body.

According to another embodiment of the invention, a lamp device-integrated rearview mirror is provided. The lamp device-integrated rearview mirror may include providing means for providing a mirror member toward a rear side of a vehicle body of a vehicle, and providing means for providing a light source and the mirror member in a housing attached to the vehicle body. The lamp device-integrated rearview mirror may further include configuring means for configuring a pair of reflecting members to reflect light emitted from the light source, toward the front side and rear side of the vehicle body.

BRIEF DESCRIPTION OF THE DRAWINGS

For proper understanding of the invention, reference should be made to the accompanying drawings, wherein.

DETAILED DESCRIPTION

Figure 1:
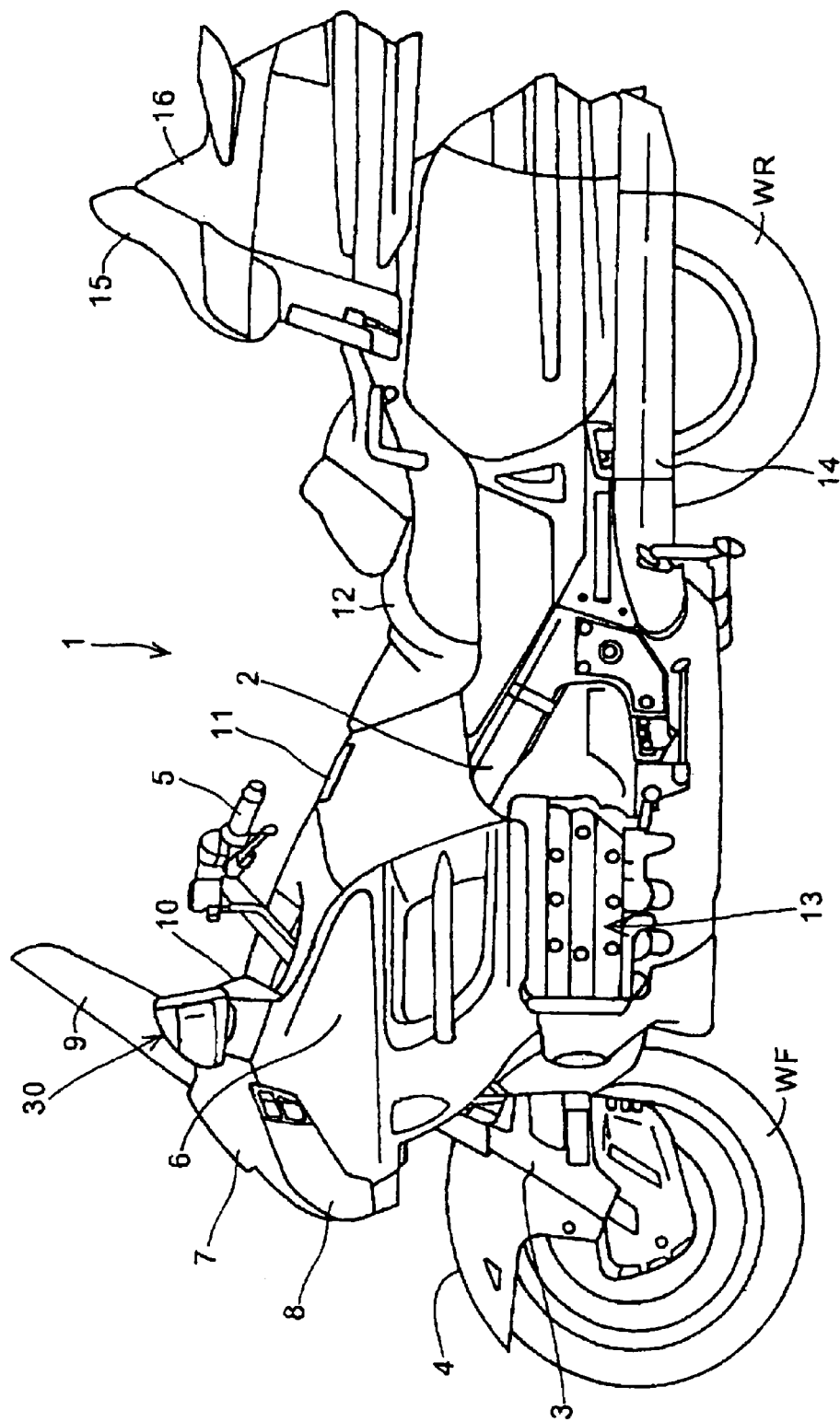
FIG. 1 is a lateral view of a motorcycle 1 to which a lamp device-integrated rearview mirror is applied, according to an embodiment of the invention.

Preferred embodiments of the present invention will hereinafter be described in detail with reference to the drawings. FIG. 1 illustrates a lateral view of a motorcycle 1 to which a lamp device-integrated rearview mirror may be applied, according to an embodiment of the invention. A pair of left and right front forks 3 may be provided on the front side of a body frame 2 so as to rotatably support a front wheel WF. Steering handlebars 5 can be attached to an upper portion of the front forks 3 so as to turn the front forks 3 for steering the front wheel WF. A front fender 4 may be provided on one of lower sides to cover the front wheel WF.

An engine 13 serving as a power source can be mounted below the body frame 2 and covered from above by a side cowl 6 as an exterior component. A front cowl 7 and a pair of left and right headlights 8 can also be attached on the front side of the side cowl 6.

A windshield screen 9 may be attached to an upper portion of the front cowl 7. A meter panel 10 including a speed meter and a rotating meter can be disposed rearward of and below the windshield screen 9. A pair of left and right rearview mirrors 30 according to an embodiment of the invention can be respectively attached to the side cowls 6 on the widthwise left and right sides of the meter panel 10. The rearview mirror 30 will be detailed below.

A filler opening lid 11 may be disposed rearward of the steering handlebars 5. A seat 12 on which a rider sits is mounted rearward of the filler opening lid 11. A rear wheel WR serving as a drive wheel rotatably supported by swing arms not shown can be disposed on the rear side of the body frame 2. Combustion gas discharged from the engine 13 is discharged from the rear side of the body vehicle via silencers 14 on the vehicle-widthwise (or lateral) left and right sides of the rear wheel WR. A rear trunk 16 may be mounted on the rearmost portion of the motorcycle 1. A back rest 15 of a rear seat can be attached to a vehicle body front surface of the rear trunk 16.

Figure 2:
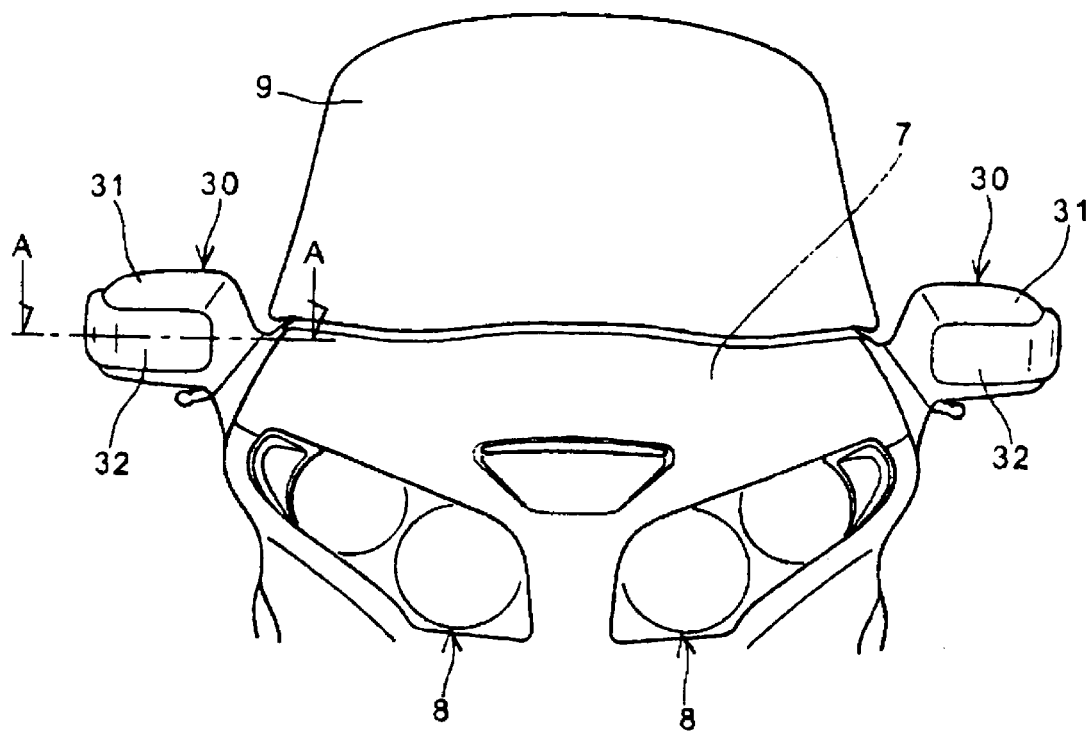
FIG. 2 is a partial enlarged front view of the motorcycle 1, according to an embodiment of the invention.
Figure 3:
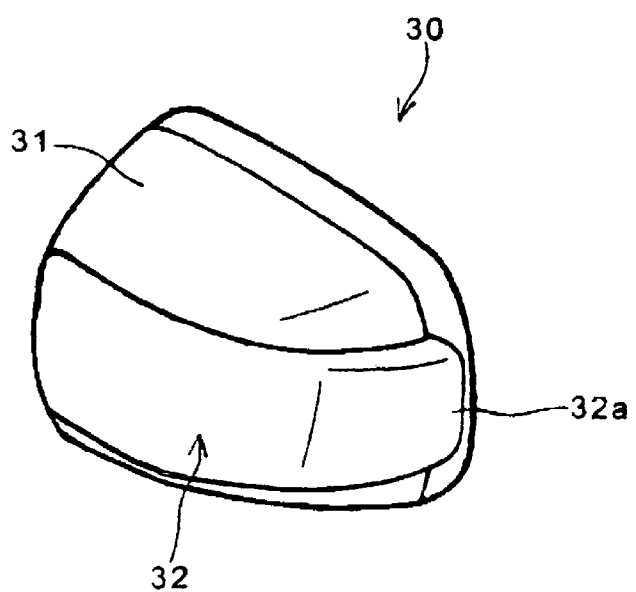
FIG. 3 is a perspective view of the rearview mirror (on the left side of the vehicle), according to an embodiment of the invention.
Figure 4:
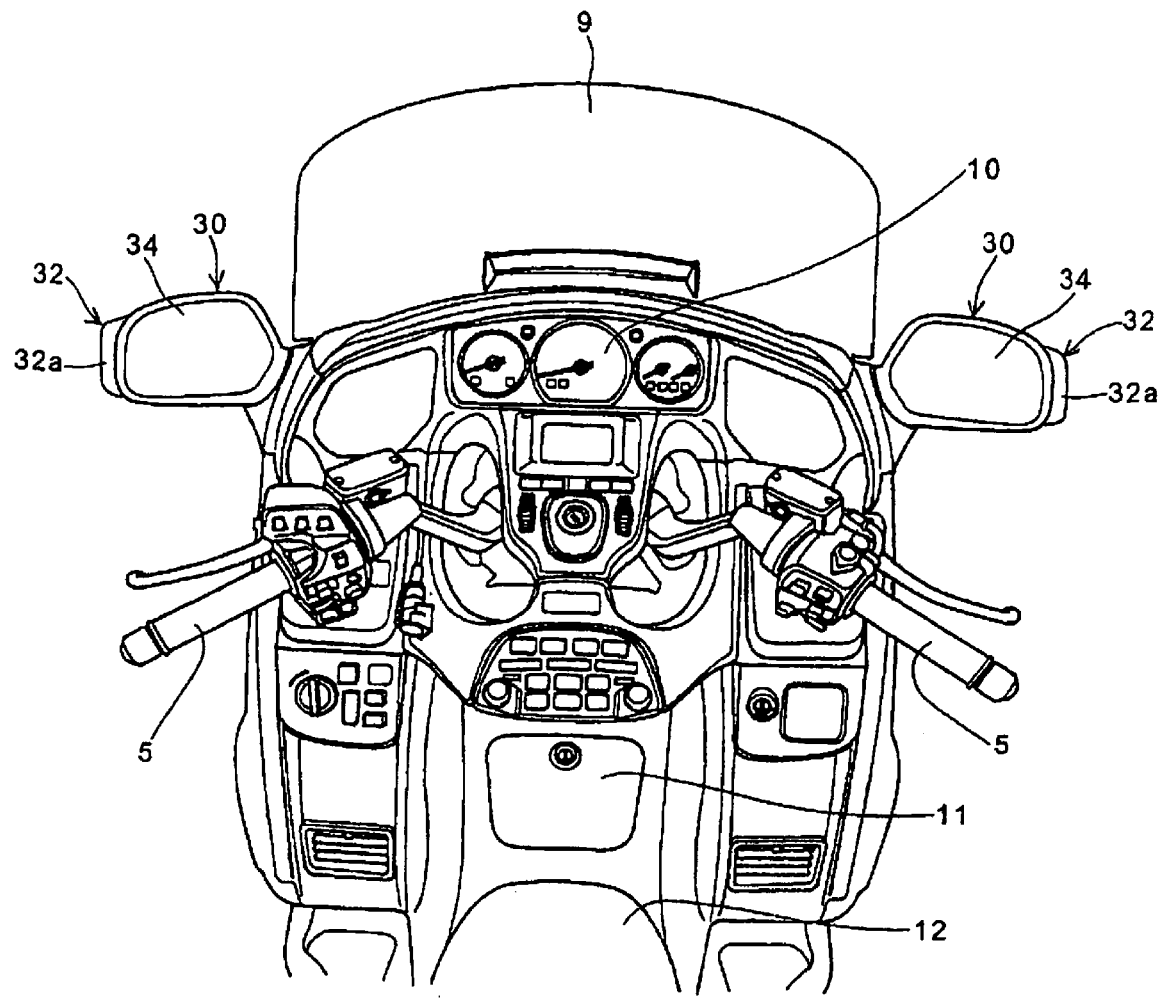
FIG. 4 is a partial enlarged view of the motorcycle as viewed from the rear side of the vehicle body, according to an embodiment of the invention.

FIG. 2 illustrates a partial enlarged front view of the motorcycle 1, according to an embodiment of the invention. FIG. 3 illustrates a perspective view of the lamp device-integrated rearview mirror 30 (on the left side of the vehicle) according to the embodiment of the invention. FIG. 4 illustrates a partial enlarged view of the motorcycle 1 as viewed from the rear side of the vehicle body, according to an embodiment of the invention. The same reference numerals as those in the above description of FIG. 1 denote the identical or corresponding parts in FIGS. 2-4. The rearview mirrors 30 shaped symmetrically to each other are each shaped such that a mirror member 34 used by a driver to confirm the rear is attached to a vehicle body rear side opening portion of a housing 31 secured to the vehicle body. A bulb (see FIG. 5) serving as a light source may be disposed inside the housing 31. A transparent and colorless or colored lens 3 which transmits light emitted from the bulb can be attached to the vehicle body front side of the housing 31. The housing 31 and the lens 32 can each be formed of an ABS resin or the like.

The lens 32 can be shaped to not only extend over a range oriented toward the front of the vehicle body but extend to the vehicle-widthwise external side, that is, extend around the lateral portion of the housing 31. Because of this shape, a protruding portion 32a of the lens 32 may protrude toward the vehicle-widthwise (or lateral) external side of the housing. Specifically, as shown in FIG. 3, when viewed from the vehicle body rear side, the protruding portion 32a is viewed to protrude toward the vehicle-widthwise (or lateral) external side of the mirror member 34 and of the housing 31. The bulb, according to one embodiment, may function as a vehicle-width lamp (a position lamp) to show the presence of the motorcycle 1 to occupants of other vehicles, pedestrians and the like.

Figure 5:
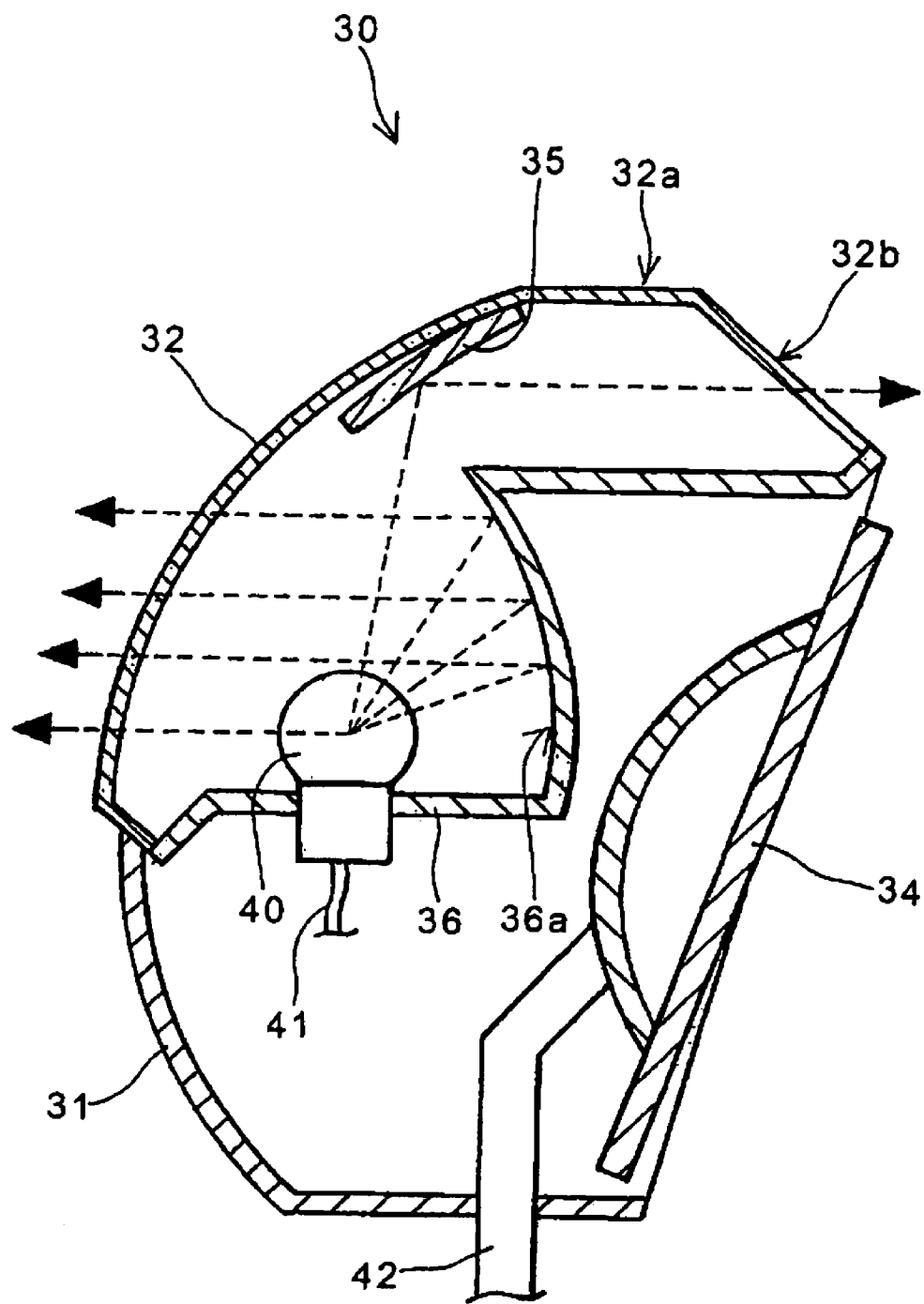
FIG. 5 is a cross-sectional view taken along line A-A of FIG. 2, according to an embodiment of the invention.

FIG. 5 illustrates a cross-sectional view taken along line A-A of FIG. 2. The same reference numerals as those in the above description denote the identical or corresponding parts of FIG. 5. The mirror member 34 can be supported via a support stay 42 extending from the vehicle body so as to be adjustable in angle relative to the housing 31. A reflector 36 supporting the bulb 40 may be provided inside the housing 31. The bulb 40 is configured to receive electricity supplied via a line 41 and to be lit by turning on a main power supply equipped in the vehicle.

The lamp device-integrated rearview mirror 30, according to one embodiment, is characterized in that the single bulb 40 can concurrently irradiate the front side and rear side of the vehicle body. To achieve this, the rearview mirror 30 may be equipped with a pair of reflecting members: a reflector 36 as a reflecting member on one side and a reflecting member 35 on the other side.

Light emitted from the bulb 40 in a main optical-axial direction (a direction of the head-top portion of the bulb 40) at an angle greater than a given angle is not only directly emitted toward the vehicle body front side, but also reflected toward the vehicle body front side by a concave reflecting surface 36a of the reflector 36. On the other hand, light emitted from the bulb 40 in a range of given angle close to the main optical-axial direction may be reflected toward the vehicle body rear side by the reflecting member 35 provided inside the lens 32. Then, the reflected light may pass through a rear transmissive portion 32b of the lens 32, and can be emitted toward the vehicle body rear side. Incidentally, the reflecting member 35 provided on the rear side of the lens 32 can be formed of resin subjected to plating or metal deposition and can be formed integrally with the lens 32 or with the reflector 36.

Figure 8:
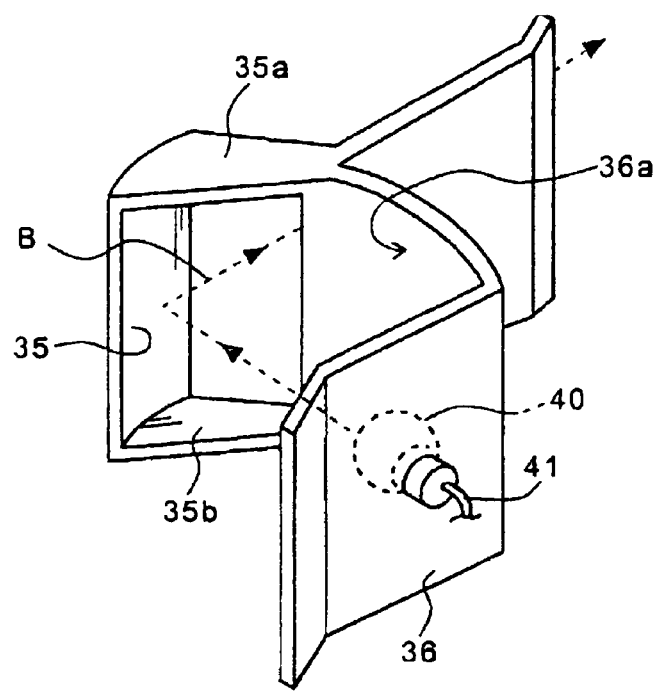
FIG. 8 is a perspective view of a reflector according to an embodiment of the present invention.
Figure 9:
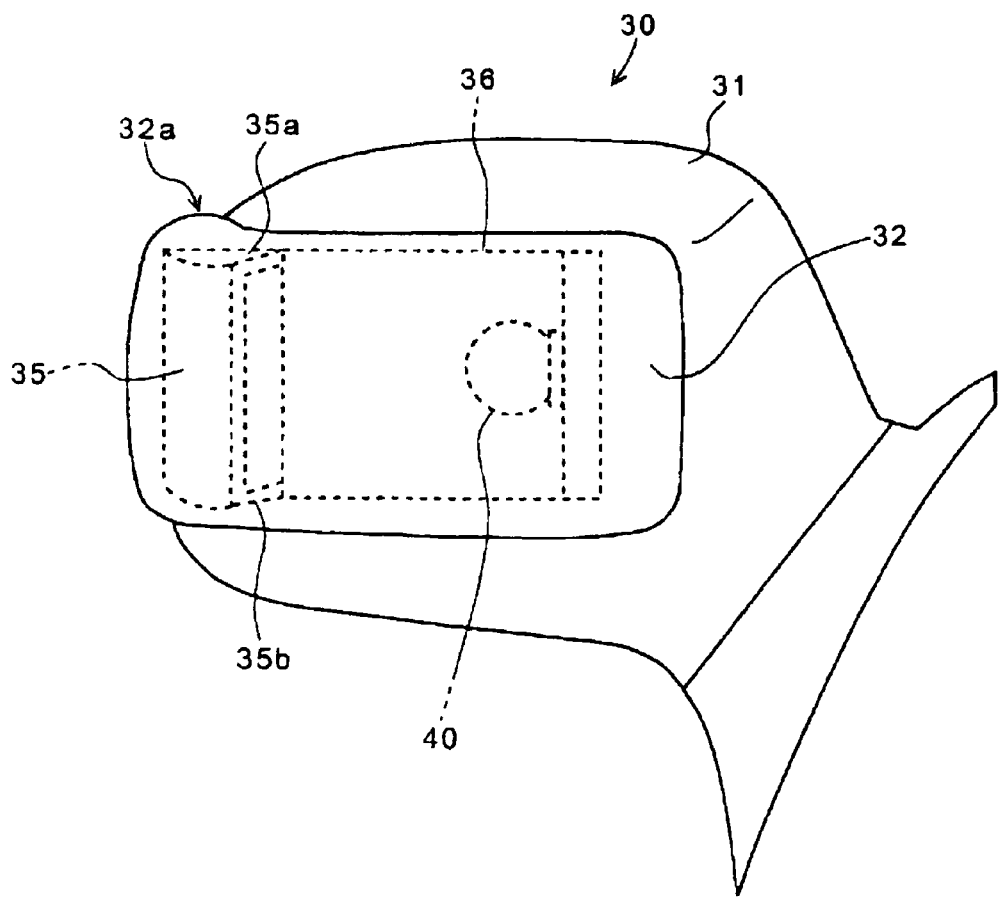
FIG. 9 is a front view of a rearview mirror (on the right side of the vehicle body) to which the reflector according to an embodiment of the invention is applied.

FIG. 8 illustrates a perspective view of a reflector 36 formed integrally with a reflecting member 35 according to another embodiment of the present invention. FIG. 9 illustrates a front view of a rearview mirror 30 (on the vehicle body right side) to which the reflector 36 can be applied according to an embodiment of the invention. In this embodiment, the reflecting member 35 may be supported by the reflector 36 via upper and lower support plates 35a, 35b. The reflecting member 35 and reflector 36 can be integrally molded to enable a reduction in the number of component parts. Incidentally, a broken line B indicates the trajectory of light that may be emitted from a bulb 40 and reflected by the reflecting member 35 toward the vehicle body rear side.

Returning now to FIG. 5, the appropriate distribution of light emitted in the back and forth directions of the vehicle body can be set depending on the shape and attachment angle of the reflector 36 and of the reflecting member 35. In one embodiment, the end portion of the reflecting surface 36a of the reflector 36 may be allowed to project toward the front side of the vehicle body to thereby adjust the quantity of irradiation light reflected toward the rear side of the vehicle body. While only the irradiation light within the given range close to the main optical-axial direction is allowed to reach the reflecting member 35, the irradiation light can be prevented from directly reaching the vehicle-widthwise external side surface of the protruding portion 32a. Because of this, if the rearview mirror 30 according to one embodiment is visually viewed from the outside, specifically, from the front side or rear side of the vehicle body, intensive irradiation light is confirmed. On the other hand, if the rearview mirror 30 is visually viewed from the side, feeble irradiation light is confirmed. The spreading manner of irradiation light encountered when the rearview mirror 30 is visually viewed from the rear direction of the vehicle body can be set for particular applications depending on the shape or surface treatment of the rear transmissive portion 32b.

A filament type incandescent bulb may be applied to the bulb 40 according to one embodiment; however, electrical power saving and downsizing of the housing 31 can be achieved by replacing it with a light source such as a light-emitting diode. Light emitted from the position light can be colored by pigmenting the bulb 40 or the lens 32. For example, if the bulb 40 or the lens 32 is pigmented in reddish or yellowish colors, it has different coloration from that of a whitish headlight. This can make the position light more conspicuous.

The lens 32 can be formed as an integral type or a division type. In one embodiment, since the lens 32 is of an integral type, the lens can also be arranged on the lateral surface portion of the housing 31 such that less irradiation light is transmitted. However, a configuration may be adopted in which a lens transmitting light toward the front side of the vehicle body and a lens transmitting light toward the rear side of the vehicle body are arranged independently of each other. Such a configuration can further enhance the flexibility of design.

The protruding portion 32a of the lens 32 can visually be viewed while the occupant of the motorcycle 1 assumes riding posture. Therefore, during night-time travel or putting the vehicle into the garage, for example, the distance between the rearview mirror 30 and an obstacle can easily be grasped to reduce the possibility that the rearview mirror contacts the obstacle.

Figure 6:
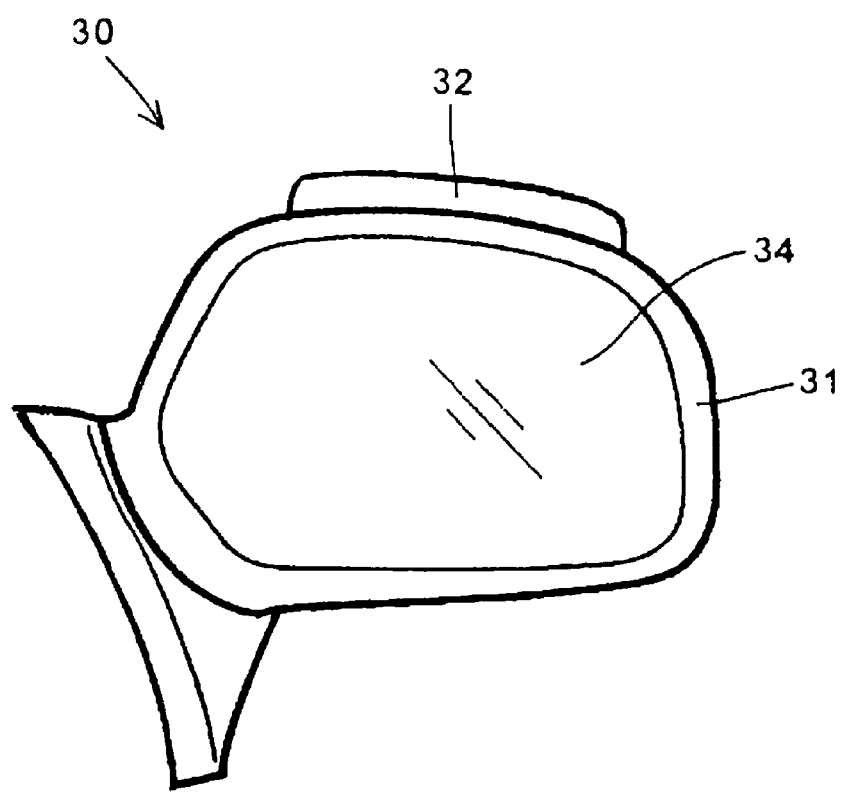
FIG. 6 is a rear view of a rearview mirror according to one embodiment of the invention.
Figure 7:
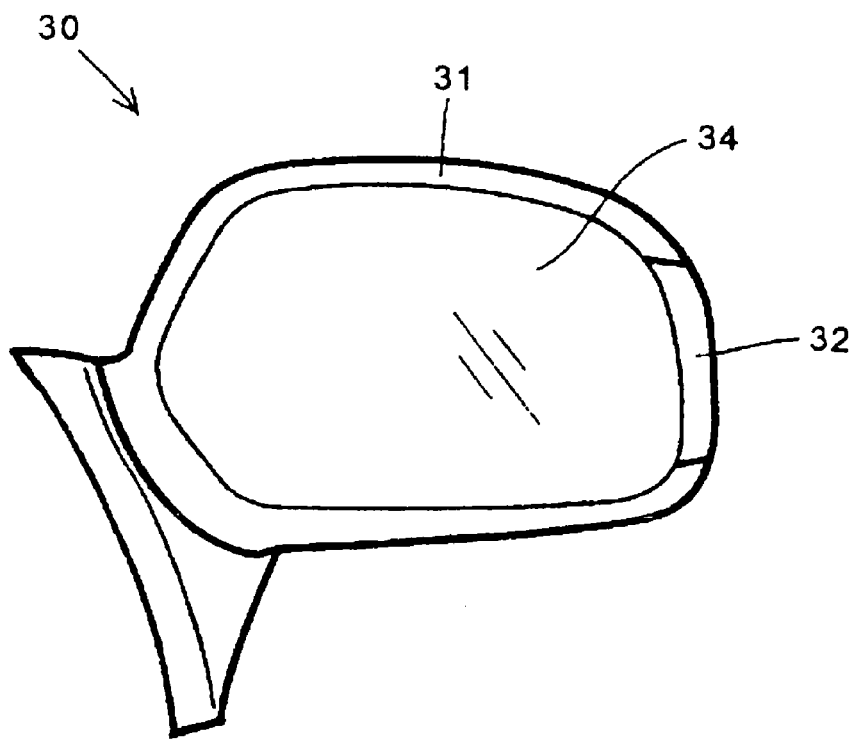
FIG. 7 is a rear view of a rearview mirror according to another embodiment of the invention.

The manner in which the lens 32 is shaped and viewed from the rear side of the vehicle body is not limited to the above embodiment. The lens 32 can be modified in various ways. For example, the lens 32 may be modified as in a first modification illustrated in FIG. 6 in which it projects from the housing 31 toward the upside or downside of the vehicle body. Alternatively, the lens 32 may be modified as in a second modification illustrated in FIG. 7 in which the lens 32 is not protruded in the outer circumferential direction of the housing 31 and the rear transmissive portion is located outside the mirror member 34 and fitted inside the outer circumferential portion of the housing 31.

As described above, the rearview mirror according to embodiments of the present invention may be such that the reflecting member is provided inside the lens configured to transmit light emitted from the bulb so as to reflect the light emitted from the bulb also toward the rear side of the vehicle body. In this way, the lamp device-integrated rearview mirror can be provided in which the single light source can irradiate the back and forth directions of the vehicle body at the same time. Thus, the visibility of the motorcycle not only from the front of the vehicle body but from the rear of the vehicle can significantly be enhanced.

The shape and material of the housing, lens, reflector and reflecting member and the type and placement of the bulb are not limited by the embodiments described above. They can be modified in various ways. In the embodiment described above, the bulb is allowed to function as a position light; however, it may be allowed to function as a blinker or other light devices. The lamp device-integrated rearview mirror according to the present invention can be applied not only to the motorcycles but to three-wheeled vehicles, four-wheeled vehicles, etc.

Thus, according to one embodiment, a lamp device-integrated rearview mirror in which a mirror member oriented toward the rear side of a vehicle body and a light source for lamp are provided in a housing attached to the vehicle body of a vehicle. The light source can be composed of a single bulb, and a pair of reflecting members is provided which are configured to reflect light emitted from the light source, toward the front side and rear side of the vehicle body.

According to another embodiment, a lens may be attached to the housing to transmit the emitted light and a reflecting member may be provided to reflect the emitted light toward the rear side of the vehicle body on a rear side of the lens. A reflecting member may also be provided inside the housing on the other side to reflect the emitted light toward the front side of the vehicle body.

According to another embodiment, a portion of the lens, configured to transmit the light emitted from the light source toward the rear side of the vehicle body, may protrude in an outer circumferential direction of the mirror member.

According to another embodiment, the mirror member is fitted in an opening portion of the housing; and a portion of the lens, configured to transmit the light emitted from the light source toward the rear side of the vehicle body, may protrude in an outer circumferential direction of the housing.

According to another embodiment, a portion of the lens, configured to transmit the light emitted from the light source toward the rear side of the vehicle body, may protrude a vehicle-widthwise external side from the housing.

In another embodiment, the light emitted from the light source functions as a position light.

According to an embodiment, the light source may be a filament type bulb. In another embodiment, the light source may be a light-emitting diode.

According to certain embodiments, the vehicle may be a two-wheeled or three-wheeled vehicle.

According to one embodiment, an emission color of the emitted light that has passed through the lens can be reddish or yellowish.

According to an embodiment, the light source may be composed of a single bulb, and a pair of reflecting members can provided and configured to reflect light emitted from the light source, toward the front side and rear side of the vehicle body. Therefore, a lamp device-integrated rearview mirror can be provided that can irradiate the back and forth directions of the vehicle body at the same time by use of the single light source. Thus, visibility not only from the front of the vehicle body but from the rear thereof can significantly be enhanced. Since the housing of the rearview mirror is frequently disposed at the highest position of the vehicle body, it is less probable that light emitted toward the rear side of the vehicle body is shielded by the occupant's body or the like. Thus, high-visibility can be ensured.

According to another embodiment, a lens is provided that is attached to the housing to transmit the emitted light, and a one side reflecting member is provided on the rear side of the lens and is configured to reflect the emitted light toward the rear side of the vehicle body. An other side reflecting member may be provided inside the housing and configured to reflect the emitted light toward the front side of the vehicle body. Therefore, a relatively simple configuration provides the lamp device-integrated rearview mirror that can irradiate the back and forth directions of the vehicle body at the same time. Thus, compared with the case of using a plurality of light sources, the shape of the housing can be simplified and the number of component parts and production man-hours can be reduced.

According to one embodiment, a portion of the lens, configured to transmit the light emitted from the light source toward the rear side of the vehicle body, protrudes in an outer circumferential direction of the mirror member. Therefore, the visibility from the rear of the vehicle body can further be enhanced. In addition, if the rearview mirror is provided on the left and right of the vehicle body, the vehicle-width interval of irradiation light is likely to increase, which can make rearward irradiation light further conspicuous.

According to another embodiment, the mirror member can be fitted in the opening portion of the housing and a portion, of the lens, adapted to transmit the light emitted from the light source toward the rear side of the vehicle body protrudes in an outer circumferential direction of the housing. Therefore, a lamp device-integrated rearview mirror can be provided that can emit irradiation light from the outside of the housing of the rearview mirror to enhance visibility from the rear of the vehicle body.

According to another embodiment, a portion of the lens, configured to transmit the light emitted from the light source toward the rear side of the vehicle body, may protrude toward a vehicle-widthwise external side from the housing. Therefore, the vehicle-widthwise interval of light emitted toward the rear of the vehicle body can be increased as much as possible to enhance the visibility of the lamp device.

According to another embodiment, the light emitted from the light source may function as a position light. Therefore, since the position light is provided at the rearview mirror located at the vehicle-widthwise outermost side, the visibility from the rear of the vehicle body can significantly be enhanced.

According to another embodiment, since the light source may be a filament type bulb, a lamp device-integrated rearview mirror can be provided that uses the same general bulb as the conventional one without use of a special light source.

According to another embodiment, since the light source may be a light-emitting diode, the downsizing and electric power saving of the lamp device-integrated rearview mirror can be achieved compared with the configuration of the filament type bulb.

According to another embodiment, the vehicle may be a two-wheeled or three-wheeled vehicle. Even in the two-wheeled or three-wheeled vehicle in which the vehicle body has a narrow left-right width, the left and right rearview mirrors having the greatest vehicle-widthwise size functions as a lamp device. Thus, the visibility from the back and forth directions of the vehicle body can significantly be enhanced.

According to another embodiment, an emission color of the emitted light that has passed through the lens may be reddish or yellowish. Therefore, the light emitted from the rearview mirror can be made different in color from the headlight or the like. Thus, the rearview mirror can be made conspicuous to enhance visibility.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

DESCRIPTION OF REFERENCE NUMERALS

1 . . . Motorcycle,
7 . . . Front cowl,
8 . . . Headlight,
9 . . . Windshield screen,
10 . . . Meter panel,
30 . . . Rearview mirror,
31 . . . Housing,
32 . . . Lens,
32a . . . Protruding portion,
32b . . . Rear transmissive portion,
34 . . . Mirror member,
35 . . . Reflecting member (one side reflecting member),
36 . . . Reflector (the other side reflecting member),
36a . . . Reflecting surface,
40 . . . Bulb

We claim:

1. A lamp device-integrated rearview mirror, comprising:
a mirror member oriented toward a rear side of a vehicle body of a vehicle;
a light source;
a pair of reflecting members configured to reflect light emitted from the light source, toward the front side and rear side of the vehicle body,
wherein the mirror member and light source are included in a housing attached to the vehicle body; and
a lens attached to the housing to transmit the emitted light,
wherein a portion of the lens, configured to transmit the light emitted from the light source toward the rear side of the vehicle body, is configured to protrude laterally from the housing.

2. The lamp device-integrated rearview mirror according to claim 1, further comprising:
a first side reflecting member configured to reflect the emitted light toward the rear side of the vehicle body, wherein the first side reflecting member is included on a rear side of the lens; and
a second side reflecting member configured to reflect the emitted light toward the front side of the vehicle body, wherein said second side reflecting member is included inside the housing.

3. The lamp device-integrated rearview mirror according to claim 2,
wherein a portion of the lens, configured to transmit the light emitted from the light source toward the rear side of the vehicle body, is configured to protrude in an outer circumferential direction of the mirror member.

4. The lamp device-integrated rearview mirror according to claim 2,
wherein the mirror member is fitted in an opening portion of the housing, and wherein a portion of the lens, configured to transmit the light emitted from the light source toward the rear side of the vehicle body, is configured to protrude in an outer circumferential direction of the housing.

5. The lamp device-integrated rearview mirror according to claim 2,
wherein the lens is configured to transmit the emitted light with an emission color of red or yellow.

6. The lamp device-integrated rearview mirror according to claim 1,
wherein the light source is configured to emit light to function as a position light.

7. The lamp device-integrated rearview mirror according to claim 1,
wherein the light source comprises a filament type bulb.

8. The lamp device-integrated rearview mirror according to claim 1,
wherein the light source comprises a single bulb.

9. The lamp device-integrated rearview mirror according to claim 1,
wherein the light source comprises a light-emitting diode.

10. The lamp device-integrated rearview mirror according to claim 1,
wherein the vehicle comprises a two-wheeled or three-wheeled vehicle.

11. A method, comprising:
providing a mirror member toward a rear side of a vehicle body of a vehicle;
providing a light source and the mirror member in a housing attached to the vehicle body;
configuring a pair of reflecting members to reflect light emitted from the light source, toward the front side and rear side of the vehicle body;
attaching a lens to the housing to transmit the emitted light; and
configuring a portion of the lens, configured to transmit the light emitted from the light source toward the rear side of the vehicle body, to protrude laterally from the housing.

12. The method according to claim 11, further comprising:
configuring a first side reflecting member to reflect the emitted light toward the rear side of the vehicle body, wherein the first side reflecting member is included on a rear side of the lens; and
configuring a second side reflecting member to reflect the emitted light toward the front side of the vehicle body, wherein said second side reflecting member is included inside the housing.

13. The method according to claim 12, further comprising:
configuring a portion of the lens, configured to transmit the light emitted from the light source toward the rear side of the vehicle body, to protrude in an outer circumferential direction of the mirror member.

14. The method according to claim 12, further comprising:
fitting the mirror member in an opening portion of the housing.

15. The method according to claim 14, further comprising:
configuring a portion of the lens, configured to transmit the light emitted from the light source toward the rear side of the vehicle body, to protrude laterally from the housing.

16. The method according to claim 11, further comprising:
configuring the light source to emit light to function as a position light.

17. The method according to claim 11, wherein the light source comprises a single bulb.

18. The method according to claim 11,
wherein the light source comprises a filament type bulb.

19. The method according to claim 11, wherein the light source comprises a light-emitting diode.

20. The method according to claim 11, wherein the vehicle comprises a two-wheeled or three-wheeled vehicle.

21. The method according to claim 11, further comprising:
configuring the lens to transmit the emitted light with an emission color of red or yellow.

22. A lamp device-integrated rearview mirror, comprising:
providing means for providing a mirror member toward a rear side of a vehicle body of a vehicle;
providing means for providing a light source and the mirror member in a housing attached to the vehicle body; and
configuring means for configuring a pair of reflecting members to reflect light emitted from the light source, toward the front side and rear side of the vehicle body;
attaching means for attaching a lens to the housing to transmit the emitted light; and
configuring means for configuring a portion of the lens, configured to transmit the light emitted from the light source toward the rear side of the vehicle body, to protrude laterally from the housing.

\* \* \* \* \*